United States Patent [19]
McDaid

[11] Patent Number: 6,138,975
[45] Date of Patent: Oct. 31, 2000

[54] ANCHORED TIE-DOWN RING

[75] Inventor: Cornelius McDaid, Dorchester, Mass.

[73] Assignee: Kryptonite Corporation, Canton, Mass.

[21] Appl. No.: 09/374,212

[22] Filed: Aug. 13, 1999

Related U.S. Application Data

[60] Provisional application No. 60/096,376, Aug. 13, 1998.

[51] Int. Cl.[7] .............................. B62H 5/00; B61D 45/00
[52] U.S. Cl. ........................... 248/499; 248/551; 70/233; 410/107; 410/111
[58] Field of Search .................... 248/551, 552, 248/553, 499, 500, 505; 211/4, 5, 6, 9, 7; 70/233, 234; 410/101, 106, 107, 109, 110, 111, 112, 116; 52/124.2, 125.4, 125.5

[56] References Cited

U.S. PATENT DOCUMENTS

| | | | |
|---|---|---|---|
| Re. 31,131 | 1/1983 | Torbet et al. | 52/125.3 |
| D. 311,326 | 10/1990 | Nelson | 248/499 |
| 2,879,896 | 3/1959 | Green | 211/4 |
| 3,259,086 | 7/1966 | Stein | 110/99 |
| 3,297,293 | 1/1967 | Andrews et al. | 248/361 |
| 3,414,226 | 12/1968 | Patnaude | 248/361 |
| 3,494,587 | 2/1970 | Kuhn | 248/361 |
| 3,556,457 | 1/1971 | Patnaude | 248/361 |
| 3,837,545 | 9/1974 | Rogers, Jr. | 248/552 |
| 3,884,450 | 5/1975 | Brammer | 254/164 |
| 3,905,633 | 9/1975 | Larson | 248/499 |
| 3,955,847 | 5/1976 | Schiowitz | 248/505 |
| 4,151,974 | 5/1979 | Kuhn | 248/499 |
| 4,155,231 | 5/1979 | Zane et al. | 70/18 |
| 4,166,637 | 9/1979 | Salomon | 248/505 |
| 4,179,151 | 12/1979 | Tye | 52/125 |
| 4,297,962 | 11/1981 | Johnson, Jr. | 248/499 |
| 4,512,121 | 4/1985 | Carydias et al. | 52/125.2 |
| 4,592,686 | 6/1986 | Andrews | 248/499 |
| 4,630,982 | 12/1986 | Fenner | 248/499 |
| 4,648,765 | 3/1987 | Kovaleski et al. | 410/106 |
| 4,683,895 | 8/1987 | Pohndorf | 248/505 |
| 4,907,921 | 3/1990 | Akright | 410/111 |
| 5,040,924 | 8/1991 | Kothman | 405/244 |
| 5,052,869 | 10/1991 | Hansen, II | 410/101 |
| 5,092,142 | 3/1992 | Zane et al. | 70/55 |
| 5,330,300 | 7/1994 | Jones et al. | 410/106 |
| 5,456,443 | 10/1995 | Taaffe | 248/551 |
| 5,553,715 | 9/1996 | Brotz | 211/5 |
| 5,623,843 | 4/1997 | Sands | 70/234 |
| 5,690,141 | 11/1997 | Creaghe | 137/382 |
| 5,732,991 | 3/1998 | Tsui | 52/125.5 |
| 6,030,159 | 2/2000 | Herrick et al. | 410/101 |

FOREIGN PATENT DOCUMENTS

| | | | |
|---|---|---|---|
| 484247 | 6/1952 | Canada | 410/112 |
| 2435803 | 2/1976 | Germany | 248/505 |
| 3522393 | 1/1987 | Germany | 410/107 |

*Primary Examiner*—Ramon O. Ramirez
*Assistant Examiner*—Jon A Szumny
*Attorney, Agent, or Firm*—Morse, Altman & Martin

[57] ABSTRACT

An anchored tie-down ring that mounts in or on a concrete surface to which a movable object can be secured. One embodiment includes a generally U-shaped ring with a hollow cylindrical crossbar that sits within a cavity in a block mounted flush with a concrete surface. One end of each of a pair of legs fits into the crossbar and acts as a bearing on which the ring pivots. The legs extend through the block into the concrete as an anchor. Another embodiment includes a generally U-shaped ring that is pivotally mounted in a block. Anchor bolts extend through holes in the block into the concrete surface. A rounded cover is secured to the block, denying access to the anchor bolts, and includes a cavity so that the ring lays horizontally within the cover when not in use.

13 Claims, 7 Drawing Sheets

ANCHORED TIE-DOWN RING

RELATED APPLICATIONS

The applicant wishes to claim the benefit of U.S. Provisional Patent Application Ser. No. 60/096,376, dated Aug. 13, 1998 for ANCHOR BLOCK in the name of Cornelius McDaid.

BACKGROUND OF THE INVENTION

1. Field of the Invention

The present invention relates to vehicle security, more particularly, to a permanently anchored tie-down ring to which vehicles can be secured by a cable, chain, or other means.

2. The Prior Art

When securing a large movable item, such as a ladder, motorcycle, bicycle, snowmobile, or portable generator, so that it will not be stolen, a stationary object, or anchor, is needed to which to secure the item. The person securing the item will generally use what is available, such as fences, railings, trellises, parking meters, and lamp posts. All of these anchors have other reasons for being where they are, which means that they typically are not designed to be used as an anchor for securing movable items. They may be too weak to perform adequately. For example, a chain link fence is easy to cut even if the movable item is attached by a heavy chain or cable. Some anchors may force the person to secure the movable object in a place that is inconvenient, too public, or that obstructs other activities. Some anchors may be unusable because of local ordinances that forbid such use of public facilities.

Some localities have made bicycle racks available. However, there are situations where bicycle racks are not adequate. Bicycle racks are typically located off the street, such as on the sidewalk, where it cannot be used to secure a motorcycle. And bicycle racks are, by necessity, permanently mounted. As a result, they are obtrusive and take up space that may be better used when the rack is not in use.

Other less intrusive anchors are in use. For example, some use a large eyelet or inverted U-shaped rod sunk into concrete or other permanent surface. The anchor extends upwardly from the concrete to provide a hole through which to thread a cable or chain. The hole needs to be reasonably large to accommodate large chains and large loops at the end of cables. These anchors are typically located so that they are convenient to motorcycles, but this also means that their obtrusiveness may prevent other vehicles from using the same space.

Consequently, there continues to be a need for an anchor that is convenient for use by cyclist, but that does not hinder alternate uses of the same space.

SUMMARY OF THE INVENTION

An object of the present invention is to provide a robust permanent anchor that is both secure and unobtrusive.

Another object is to provide an anchor that can be stored out of the way when not in use.

Yet another object is to provide a permanent anchor that can be installed into a floor during construction or retrofitted to an existing floor.

The present invention is an anchored tie-down ring that provides a permanent anchor point on a surface, such as a concrete floor, to which a movable object, such as a ladder, motorcycle, bicycle, snowmobile, or portable generator, can be secured. The invention has an initial installation embodiment and a retrofit embodiment.

The initial installation embodiment can be installed as part of an original construction or a reconstruction. It has two configurations, the first of which has a ring, a block, a pair of legs, and a lid. The second configuration does not have a lid.

The ring of both configurations is a generally U-shaped rigid rod with an outer bearing surface at the ends thereof. The outer bearing surface, together with an axle as an inner bearing surface, provides a pivot upon which the ring can be pivoted. One example of an outer bearing surface is a hollow cylindrical crossbar across the ends of the rod. Another example is a pair of aligned circular eyelets at the ends of the rod.

The ring sits within the block, which is composed of a rigid material that will stand up to the weight of vehicles. In the first configuration, the block has a lip that is approximately flush with the floor. An outer surface depressed from the lip includes a cavity with a shape that is approximately the same as the ring. The cavity is deep enough so t hat the ring is at or below the level of the outer surface when in the cavity. The removable lid fits in a groove in the lip to prevent dirt and other materials from clogging the cavity.

In the second block configuration, the outer surface of the block is flush with the floor, and has a cavity like that of the first configuration.

Optionally, the block includes one or more outwardly extending flanges to provide an additional anchor to prevent the block from being removed from the floor.

The legs pro vide a pivot and anchor for the ring. One portion of the leg is an axle that acts as the inner bearing surface to the ring outer bearing surface, forming a pivot. The ring can pivot between an open position where the ring ex tends away from the outer surface for use, and a storage position where the ring seats in the cavity. The anchor portion of the leg extends through the block and into the floor concrete. Optionally, the legs extend at an angle from the block either downwardly or toward the side. Optionally, a foot at the end of the leg provides a more secure anchor. Alternatively, the pair of legs is replaced by a single component.

The retrofit embodiment is for use where the anchored tie-down ring is being installed in a surface that is already hardened. It has a ring, a block, anchor bolts, and a cover. The ring is a generally U-shaped rod and crossbar, both of which are preferably composed of hardened steel. The crossbar extends across the rod and acts as an inner bearing surface of a pivot. The attachment between the rod and crossbar may be permanent or removable. When removable, a standard locking mechanism can be incorporated into the crossbar.

One block configuration is a single piece of heavy material, such as steel. The block has T shape and an arch in which the crossbar seats. The semicircular inner surface of the arch acts as the outer surface of a bearing that mates with the outer surface of the crossbar to form a pivot for the ring. The ring is held within the arch when the block is bolted to the floor.

The second block configuration has a base that sits on the floor and a hollow cylinder into which the crossbar fits to form a pivot for the ring. Mounting holes are positioned so that they are obstructed by the crossbar when it is in the cylinder.

The anchor bolts extend through the block mounting holes into the floor. A sleeve is inserted into a pre-made hole in the floor and the bolts are turned into the sleeve, causing the lower portion of the sleeve to expand and wedge against the walls of the hole.

The cover provides a rounded surface that can be driven over by vehicles. It is generally round with a convex upper surface. Screws secure the cover to the block, which denies access to the anchor bolts. The ring and protruding portion of the block fit into a cavity in the cover. The cavity is shaped so that the ring can lay below the upper surface of the cover. The cover is composed of a material that will stand up to the weight of vehicles.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION

The anchored tie-down ring of the present invention provides a permanent anchor point to which a movable object can be secured. The following description of the present invention assumes that the anchored ring is mounted in or to a floor. However, the present invention also contemplates that the anchored ring 10 may be mounted in or to non-horizontal surfaces, such as ramps and walls, and the term "floor" is intended as a generic term to include those other surfaces.

There are two basic embodiments, an initial installation embodiment and a retrofit embodiment.

Initial Installation Embodiment of FIGS. 1–5

The initial installation embodiment 10, shown in FIGS. 1–5, is for use where the anchored ring can be installed as part of an original construction or a reconstruction, where the concrete into which it sits is being poured, rather than already hardened. It is possible to install the initial installation embodiment 10 in existing concrete, but this would require chiseling out a hole and pouring new concrete after the anchored ring is positioned in the hole. The initial installation embodiment has two configurations, the difference being whether or not the anchored ring has protective lid.

Figure 1:
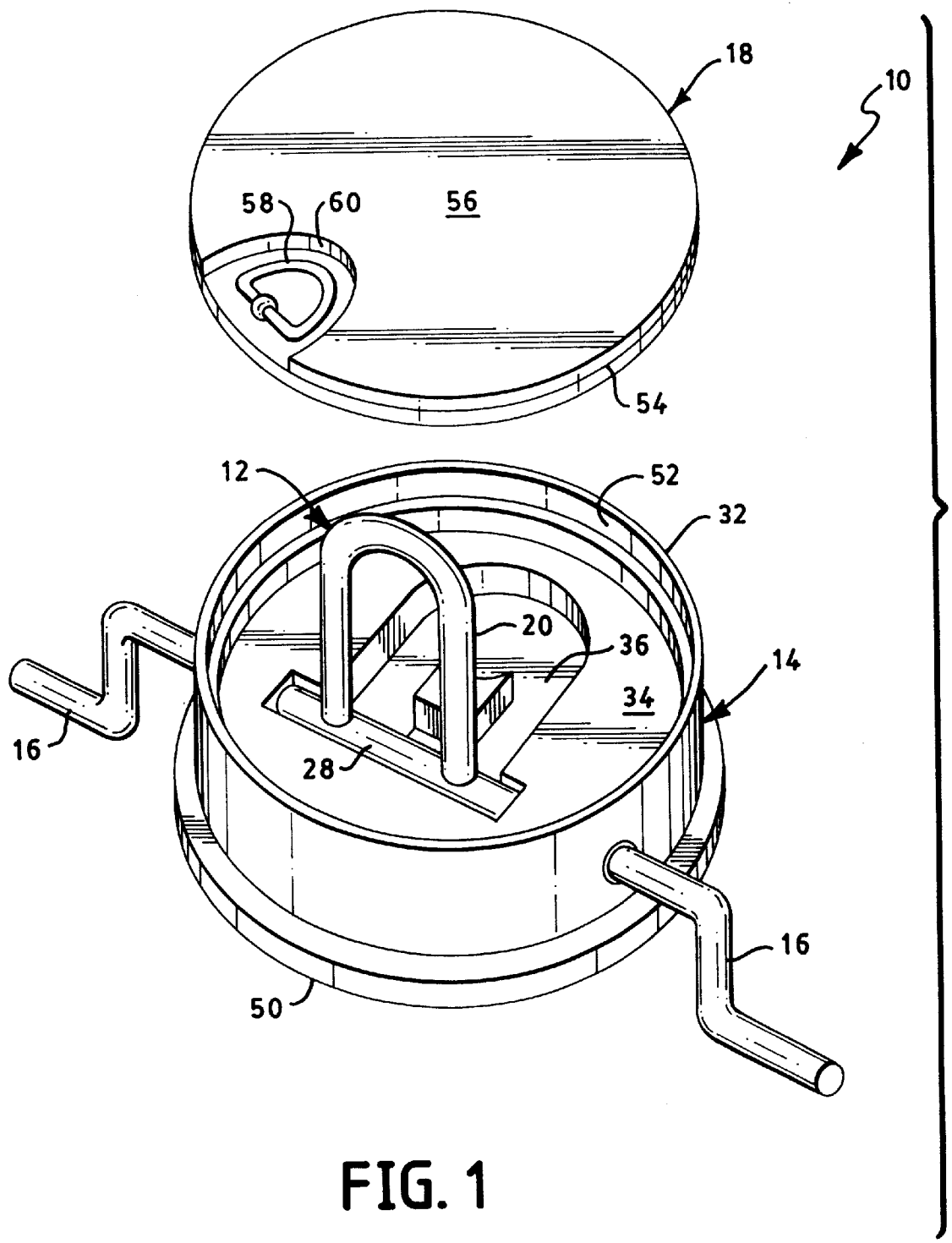
FIG. 1 is a perspective view of one configuration of the first embodiment of the present invention.
Figure 2:
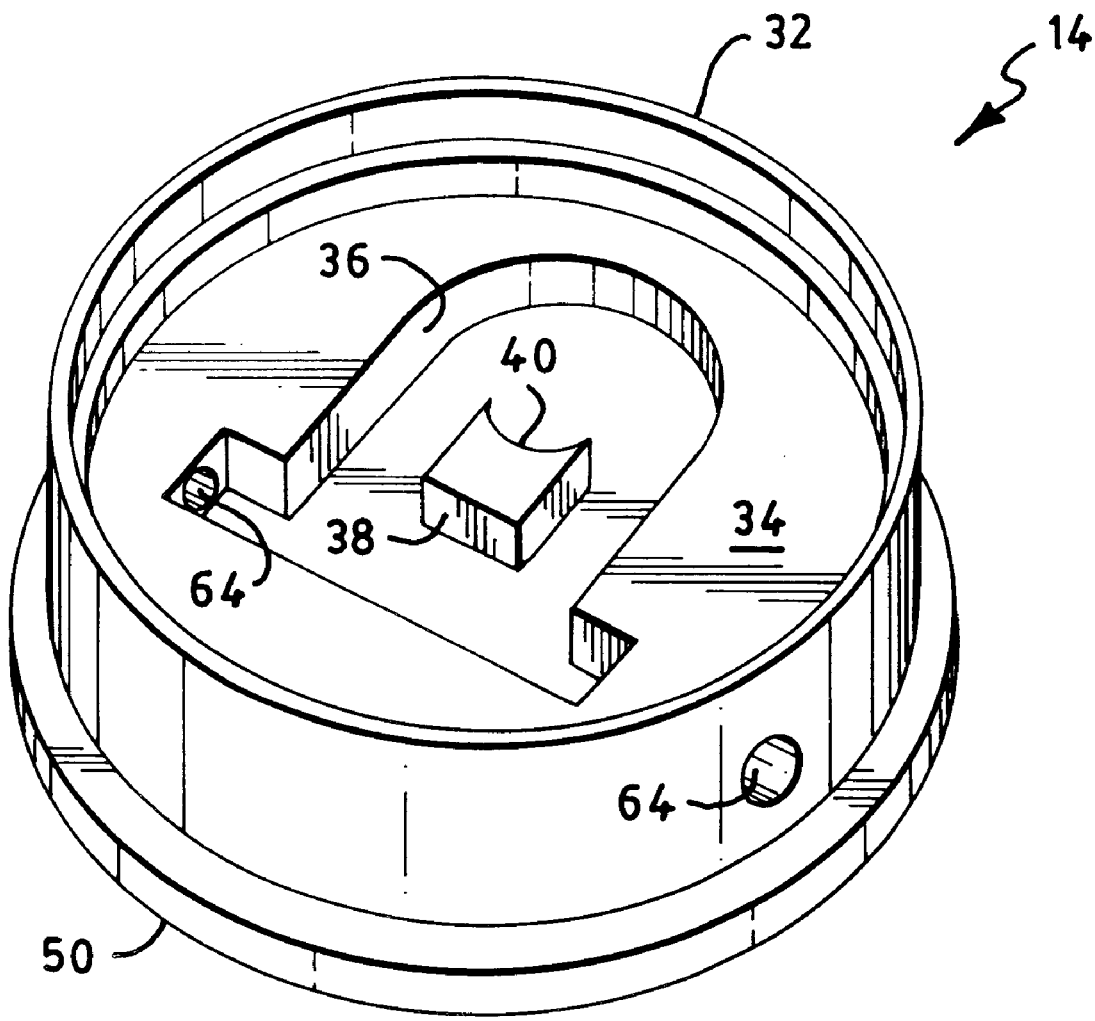
FIG. 2 is a top perspective view of the block of the embodiment of FIG. 1.
Figure 3:
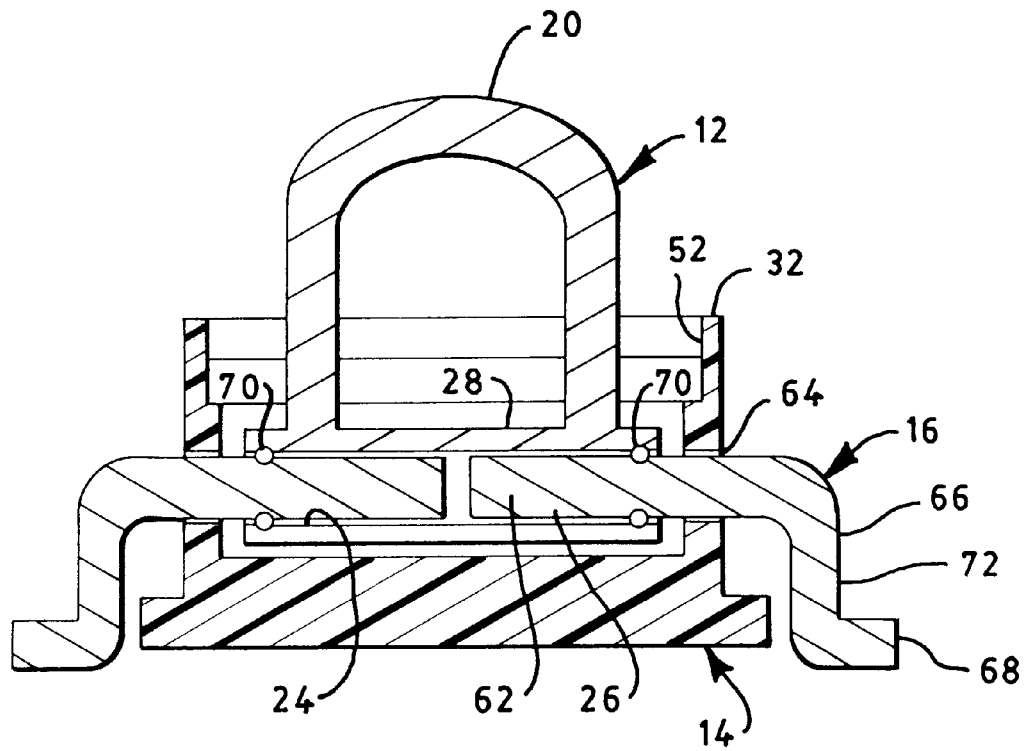
FIG. 3 is a side cross-sectional view of the embodiment of FIG. 1.

The first configuration of the initial installation embodiment 10 has four main components, a ring 12, a block 14, a pair of legs 16, and a lid 18, as shown in FIGS. 1–3. The second configuration, shown in FIG. 4, does not have a lid 18.

The ring 12 of both configurations is the component through which the chain or cable is threaded. It is a generally U-shaped rod 20. The rod 20 may be essentially semi-circular, as in FIGS. 1–4, or it may have other shapes, such as squared-off corners or a bulbous shape that is circular over more than 180°. The cross-sectional shape of the rod 20 is not important, except that a rounded cross-section is typically easier to manufacture.

Figure 4:
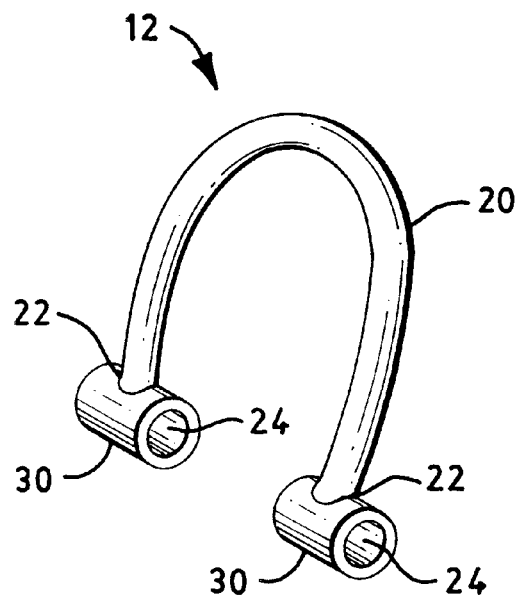
FIG. 4 is a perspective view of an alternate embodiment of the ring of FIG. 1.

At the ends 22 of the rod 20 is an outer bearing surface 24, which is a circular aperture through which an axle 26 extends and about which the ring 12 pivots. One example of such an outer bearing surface 24 is shown in FIG. 3 as a hollow cylindrical crossbar 28. The crossbar 28 extends across and slightly beyond the two ends of the rod 20. The rod 20 and crossbar 28 are permanently attached, such as by welding or being machined as one component. Another example of an outer bearing surface 24 is shown in FIG. 4, where the free ends 22 of the rod 20 have a pair of aligned circular eyelets 30. The present invention contemplates that any other arrangement that provides an outer bearing surface 24 may be used.

The ring 12 is preferably composed of strong rigid material, such as hardened steel. Optionally, the ring 12 is covered by a resilient plastic to provide a surface that is easier to handle and to aid in preventing damage to the movable object.

The block 14 is the component in which the ring 12 sits. In the first configuration, the block 14 has a lip 32 that, when installed, is approximately flush with the floor in which the anchored ring 10 is installed. Depressed from the lip 32 is an outer surface 34 that includes a cavity 36 with a shape that is approximately the same as the ring 12, including a raised portion 38 that fits within the ring 12. The cavity 36 is at least deep enough so that, when the ring 12 is laying in the cavity 36, the ring 12 is at or below the level of the outer surface. Preferably, the raised portion 38 includes a finger notch 40 for ease in pulling the ring 12 from the cavity 36 for use.

Figure 5:
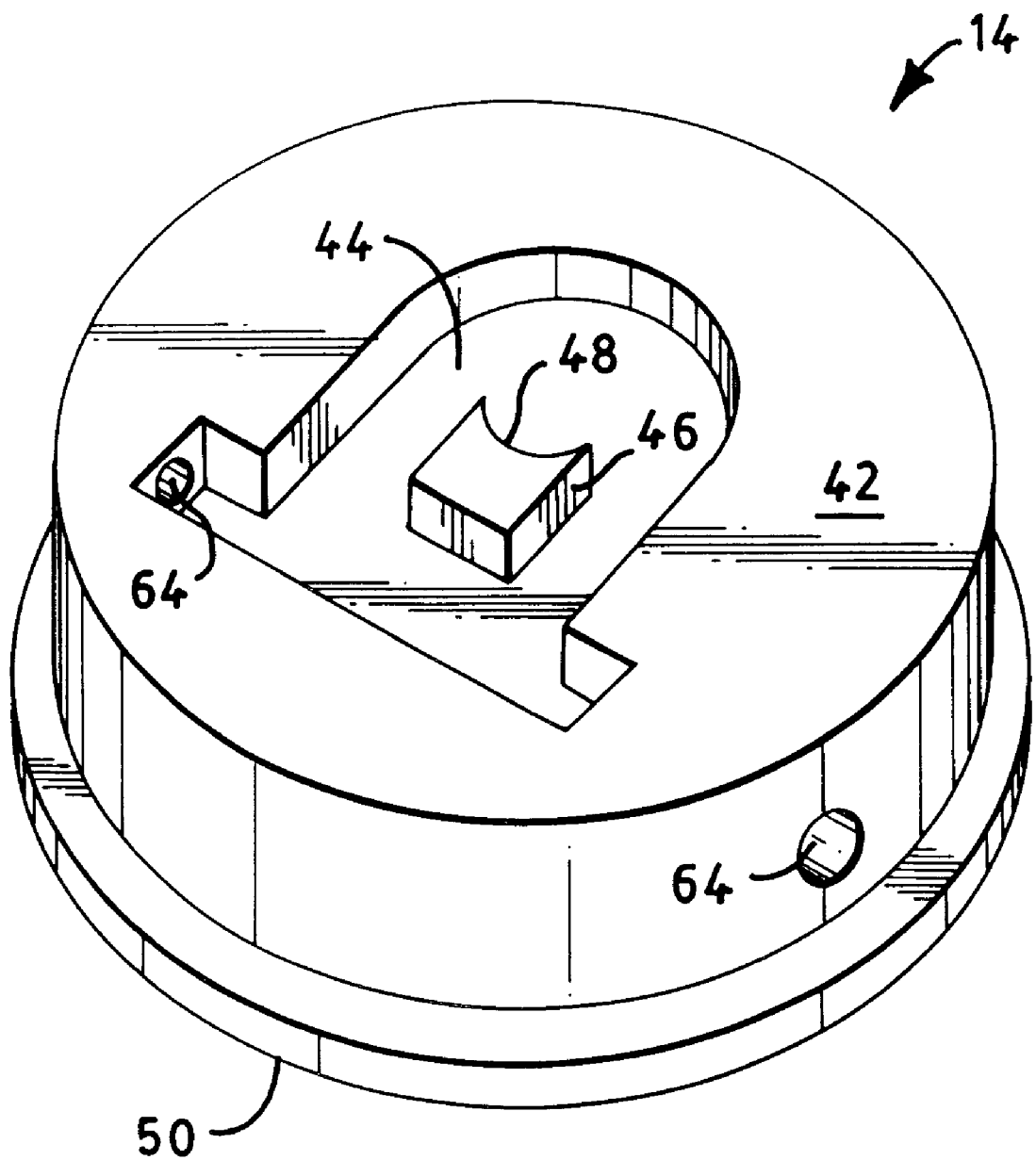
FIG. 5 is a perspective view of a second configuration of the block of the first embodiment of the present invention.
Figure 6:
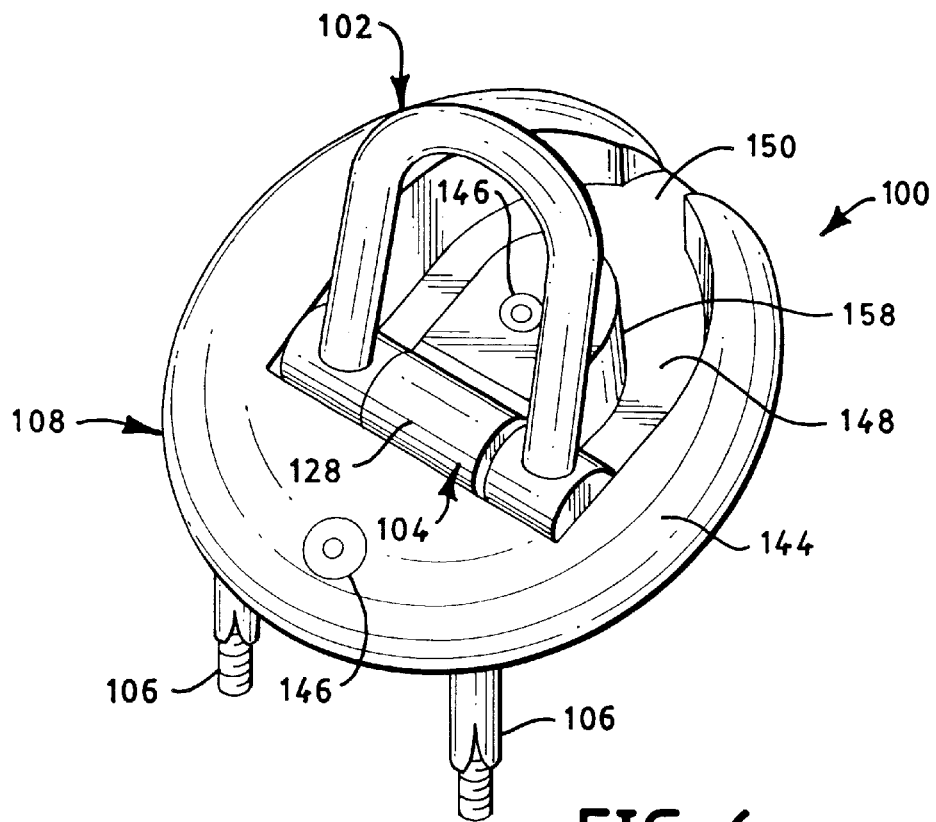
FIG. 6 is a perspective view of the second embodiment of the present invention.

In the second configuration, shown in FIG. 5, the block 14 has an outer surface 42 that, when installed, is lush with the floor. The outer surface 42 includes a cavity 44 that is approximately the same shape as the ring 12, including a central raised portion 46. As with the first configuration, the ring 12 in the cavity 44 is lower than the outer surface 42. The raised portion 46 includes a finger notch 48 for ease in pulling the ring 12 from the cavity 44 for use.

Optionally, the block 14 includes one or more flanges 50 that extend outwardly from the block 14. Preferably, the flanges 50 circle at least half the circumference of the block 14. The purpose of the flanges 50 is to provide an additional anchor to prevent the block 14 from being pulled or otherwise removed from the floor.

The first configuration includes a removable lid 18 to prevent dirt and other materials from clogging the cavity 36 that would make it more difficult to either remove the ring 12 or to allow the ring 12 to fall back into the cavity 36 when no longer in use. The lid 18 fits into a groove 52 in the lip 32 of the block 14. A resilient annular O-ring 54 is used to provide a seal to prevent most dirt and moisture from entering the block 14.

The outer side 56 of the lid 18 has a handle 58 for removing the lid 18. In a preferred embodiment, the handle 58 is a metal D-ring that pivots up out of a small depression 60 for use and back into the depression 60 for storage.

The block 14 and lid 18 are composed of rigid materials that will stand up to the weight of vehicles, such as a hard plastic or strong metal or metal alloy.

The final component is the pair of legs 16. The legs 16 provide two functions: a pivot for the ring 12 and an anchor for the ring 14. One portion 62 of the leg 16 fits into the ring crossbar 28 or eyelets 30 and acts as the inner surface of a bearing on which the ring 12 pivots. Thus, the diameter of that portion 62 is slightly smaller than the inner diameter of the crossbar 28 or eyelets 30. The ring 12 can pivot between an open position where the ring 12 extends away from the outer surface for use, and a storage position where the ring 12 seats in the cavity 36.

The anchor portion 72 of the leg 16 extends through a hole 64 in the block 14 and into the concrete. Optionally, the legs 16 extend at an angle from the block, preferably generally downwardly, as at 66. In the event the concrete is not deep enough to accommodate a downwardly extending leg, the leg may extend sideways into the concrete. Optionally, there is a foot 68 at the end of the leg 16 to provide an even more secure anchor. The foot 68 may be formed by another bend in the leg 16 or it may be another component, such as a disk, attached to the end of the leg 16.

Optionally, the bearing portion 62 of the legs 16 include a resilient O-ring 70 to prevent concrete from entering the hollow of the crossbar 28 when the anchored tie-down ring 10 is being installed.

Alternatively, the pair of legs 16 is replaced by a single component that is the combination of both legs 16. A rod is extended through the holes 64 and the crossbar 28 or eyelets 30 and then bent into the appropriate shape.

The legs 16 are preferably composed of a strong, rigid material, such as hardened steel.

Retrofit Embodiment of FIGS. 6–10

The retrofit embodiment, shown in FIGS. 6–10, is for use where the anchored ring 100 is being installed in a surface that is already hardened. This embodiment 100 has four main components, a ring 102, a block 104, anchor bolts 106, and a cover 108.

The ring 102 is the component through which the chain or cable is threaded. It includes a generally U-shaped rod 110 and a crossbar 112, both of which are preferably composed of hardened steel. The rod 110 may be semicircular, as in FIGS. 6–10, or it may have other shapes, such as with squared-off corners or a bulbous shape that is circular over more than 180°. The cross-sectional shape of the rod 110 is not important, except that a rounded cross-section is typically easier to manufacture. The crossbar 112 extends across the rod 110. The outer surface of the crossbar 112 acts as an inner bearing surface of a pivot, as described below. In the first configuration of this embodiment, shown in FIG. 8, the attachment between the rod 110 and crossbar 112 is permanent, and the attachment may be effected in any manner that is appropriate, such as by welding or casting.

Figure 9:
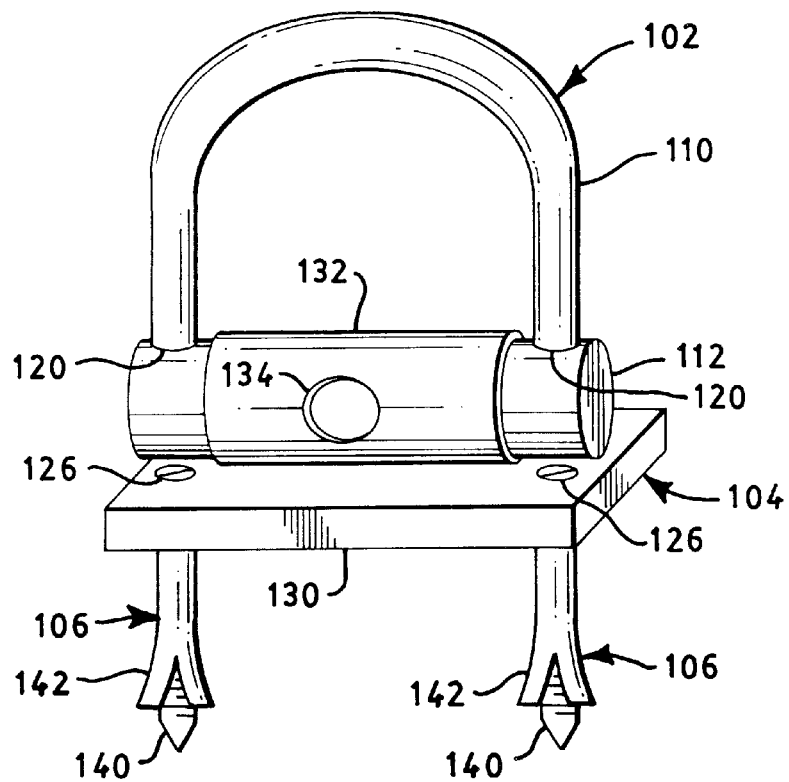
FIG. 9 is perspective view of another configuration of the embodiment of FIG. 6 without the cover.
Figure 10:
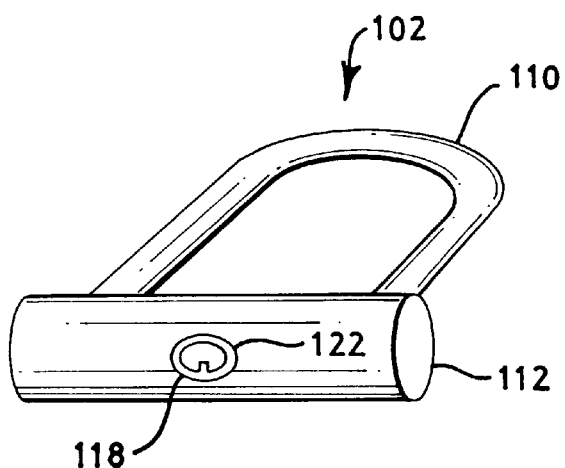
FIG. 10 is a bottom perspective view of one configuration of the ring of FIG. 8.

In the second configuration of the embodiment, shown in FIGS. 9 and 10 the rod 110 is removable from the crossbar 112, for example, by using a standard locking mechanism 118 that is entirely disposed within the crossbar 112 between the rod openings 120. The locking mechanism 118 is mounted through a hole 122 formed in the side of the crossbar 112. The locking mechanism 118 is so constructed that it does not protrude from the outer surface of the crossbar 112 so that the outer surface of the crossbar 112 remains cylindrical.

Figure 8:
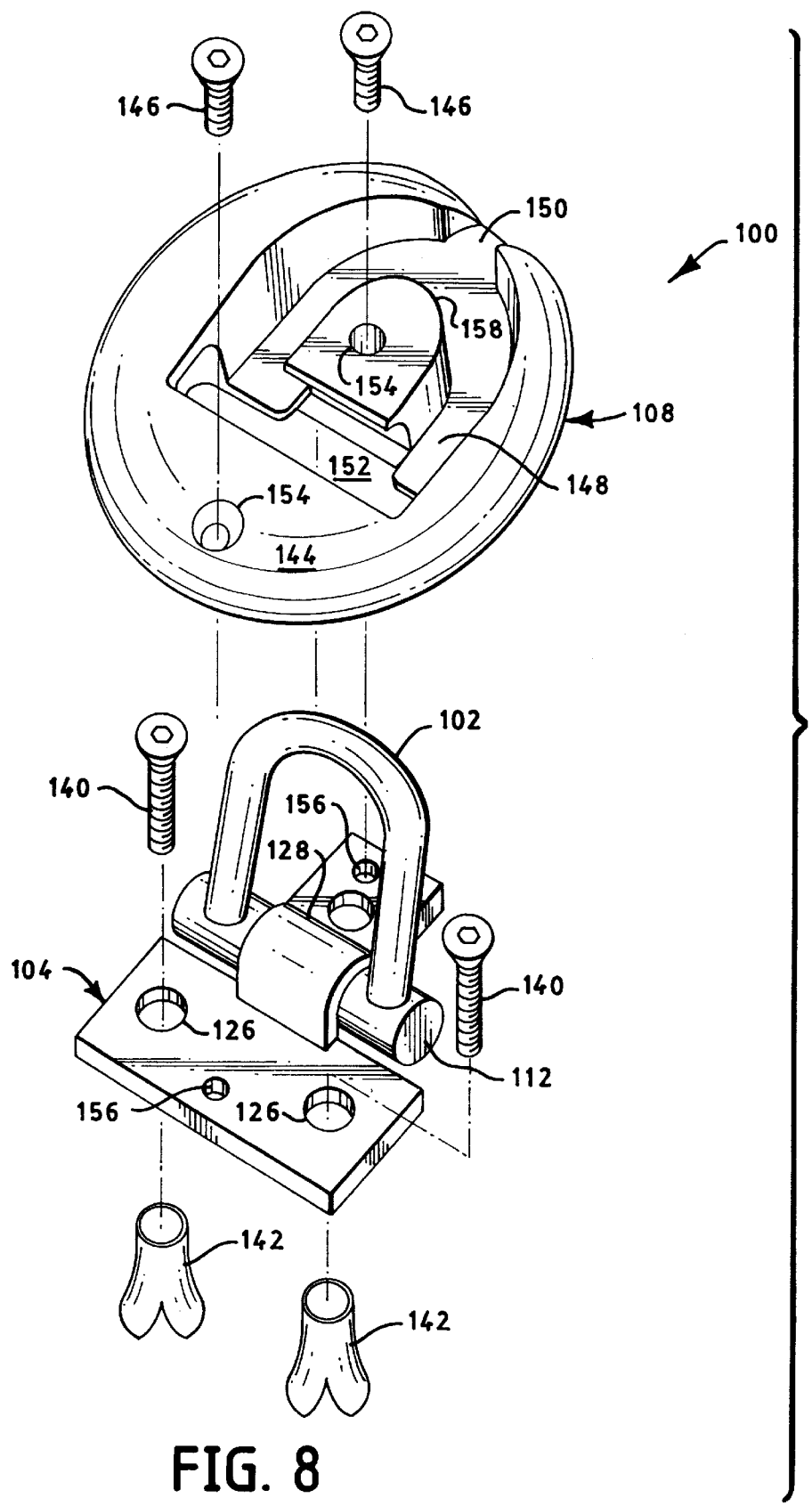
FIG. 8 is an exploded view of one configuration of the embodiment of FIG. 6.

The block 104 is the component in which the ring 102 sits. The block 104 of the first configuration of this embodiment is shown in FIG. 8. It is a single piece of heavy material, such as steel. The block 104 has a T shape with mounting holes 126 in each of the three ends. The block 104 has an arch 128 in which the ring crossbar 112 seats. The inner surface of the arch 128 is semicircular to act as the outer surface of a bearing that mates with the outer surface of the crossbar 112, with a diameter that is slightly larger than the diameter of the crossbar 112. When the block 104 is bolted to floor, the floor holds the ring 102 within the block 104.

The second configuration of the block 104, shown in FIG. 9, includes a base 130 and a hollow cylinder 132. The crossbar 112, as the inner bearing surface, fits into the cylinder 132, as the outer bearing surface, to form a pivot for the ring 102. Consequently, the cylinder 132 must be shorter than the distance between the legs of the rod 110 and the inner diameter of the cylinder 132 should be only slightly larger than the outside diameter of the crossbar 112 so that there is enough clearance for the crossbar 112 to rotate.

If the rod 110 is removably attached to the crossbar 112, there must be a way to reach the release mechanism. This is accomplished by an aperture 134 in the side of the cylinder 132 that allows access to the locking mechanism 118 when the ring 102 is not in use, in other words, when the ring 102 is horizontal.

The cylinder 132 is permanently attached to the base 130. The base 130 is a plate that sits on the surface to which the anchored ring is being attached. At each end of the base 130 is a mounting hole 126. The mounting holes 126 are positioned so that they are obstructed by the crossbar 112 when the crossbar 112 is in the cylinder 132.

In both configurations, the anchor bolts 106 extend through the mounting holes 126 and into the concrete or other surface to which the anchored ring 100 is being mounted. Anchor bolts come in two parts, a bolt 140 and a sleeve 142. The sleeve 142 fits into a pre-made hole in the concrete. When the bolt 140 is turned into the sleeve 142, the lower portion of the sleeve 142 expands against the walls of the concrete hole, wedging the sleeve/bolt combination so that it cannot be removed.

The last component is the cover 108. Part of the objective of the present invention is an anchored ring that will not prevent other uses of the area in which the anchored ring is located. Because the retrofit embodiment 100 extends above the surface to which it is mounted, a means is needed to smooth around the anchored ring. The cover 108 provides a rounded surface that can be driven over by vehicles.

Figure 7:
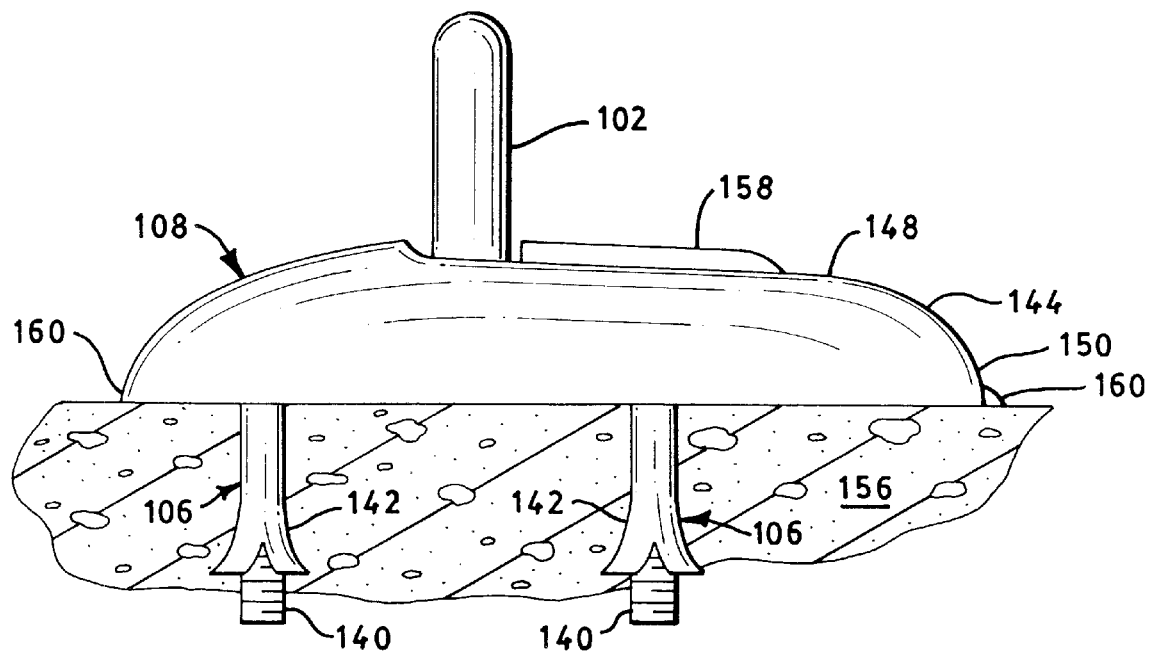
FIG. 7 is a side view of the embodiment of FIG. 6.

The cover 108 is generally round with a flat bottom that sits on the concrete surface. The upper surface 144 is convex, where the outer edges 160 meet the concrete surface and the center is higher than the highest point of the arch 128 or cylinder 132, as shown in FIG. 7. Screws 146 are used to secure the cover 108 to the block 104. The cover 108 also denies access to the anchor bolts 106 when it is secured to the block 104.

The cover 108 has a cavity 148 that is approximately the same shape as the ring 102 and into which the block 104 and ring 102 fit. Typically, the block 104 and ring 102 are mounted and secured to the concrete surface 156 by the anchor bolts 106 through the mounting holes 126. The cover 108 is placed over the arch 128 or cylinder 132 and ring 102 so that they extend through an opening 152 in the cover 108 and into the cavity 148, as in FIG. 8. The cover 108 is secured to the block 104 by screws 146 through holes 154 in the cover 108 that are turned into threaded holes 156 in the block 104. When the ring 102 is being used to secure a moveable device, the cover 108 cannot be removed from the block, even if the screws 146 are removed, because the chain or other device through the ring 102 cannot fit through the cover opening 152. The cavity 148 is shaped so that the ring 102 can lay horizontally below the upper surface 144 of the cover 108. Preferably, there is a finger notch 150 for ease in pulling the ring 102 from the cavity 148 for use. Preferably, there is a raised portion 158 that fits within the ring 102. Preferably, there is a floor in the portion of the cavity 148 in which the rod 110 rests.

The cover 108 is composed of a material that will stand up to the weight of vehicles, such as a hard plastic or steel.

Thus it has been shown and described an anchored tie-down ring which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. An anchored tie-down ring for providing a permanent anchor point on a floor, said anchored tie-down ring comprising:
   (a) a rigid ring comprised of a U-shaped rod and a circular outer bearing surface at the ends of said rod;
   (b) a rigid block adapted to be permanently mounted within said floor, said block having an outer surface at or below the level of said floor when said block is mounted within said floor, said outer surface having a cavity, said cavity having a shape that is approximately the shape of said ring and such that said ring can lay therein below the level of said outer surface; and
   (c) legs extending through openings in said block and having an inner bearing surface portion and an anchor portion, said inner bearing surface portion mating with said ring outer bearing surface to form a pivot that allows said ring to pivot between an open position wherein said ring extends away from said outer surface and a storage position wherein said ring lays within said cavity, and said anchor portion adapted to be embedded permanently within said floor.

2. The anchored tie-down ring of claim 1 wherein said outer surface is depressed within said block and said anchored tie-down ring includes a rigid lid that covers said outer surface.

3. The anchored tie-down ring of claim 2 wherein said lid includes an O-ring to form a seal between said lid and said block.

4. The anchored tie-down ring of claim 1 wherein said outer bearing surface is a hollow cylindrical crossbar.

5. The anchored tie-down ring of claim 1 wherein said outer bearing surface includes a circular eyelet at each of said ring ends.

6. The anchored tie-down ring of claim 1 wherein said block includes at least one flange extending outwardly from said block.

7. The anchored tie-down ring of claim 1 wherein said cavity has a central raised portion with a finger notch.

8. An anchored tie-down ring for providing a permanent anchor point on a floor for securing a movable object, said anchored tie-down ring comprising:
   (a) a rigid ring comprised of a U-shaped rod and a cylindrical crossbar with an inner bearing surface;
   (b) a rigid block having an outer bearing surface that mates with said inner bearing surface to form a pivot, said block having mounting holes;
   (c) mounting bolts extending through said mounting holes and adapted to secure said anchored tie-down ring to said floor;
   (d) a cover having an outer surface with an outer edge and a cavity, said cover having a hole through which said ring extends from said block, said cover being secured over said block and denying access to said mounting bolts when said anchored tie-down ring is in use securing said movable object, said cavity being shaped such that said ring can lay therein below the level of said outer surface, said outer surface being convexedly rounded such that said outer edge is adjacent to said floor; and
   (e) said pivot allowing said ring to pivot between an open position wherein said ring extends away from said outer surface and a storage position wherein said ring lays within said cavity.

9. The anchored tie-down ring of claim 8 wherein said outer bearing surface is a semicircular inner surface of an arch in said block.

10. The anchored tie-down ring of claim 8 wherein said outer bearing surface is a hollow cylinder of said block.

11. The anchored tie-down ring of claim 8 wherein said crossbar is permanently attached to said rod.

12. The anchored tie-down ring of claim 8 wherein said crossbar is removably attached to said rod.

13. The anchored tie-down ring of claim 8 wherein said cover has a finger notch.

* * * * *